(12) United States Patent
Masaki et al.

(10) Patent No.: US 6,317,401 B1
(45) Date of Patent: Nov. 13, 2001

(54) OPTICAL DISK APPARATUS WITH OPTICAL HEAD CLEANING

(75) Inventors: Takashi Masaki; Shigenori Yanagi, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/407,058

(22) Filed: Mar. 17, 1995

Related U.S. Application Data (63) Continuation of application No. 08/084,006, filed on Jun. 29, 1993, now abandoned.

(30) Foreign Application Priority Data

Jul. 3, 1992 (JP) .................................................. 4-176308

(51) Int. Cl.⁷ .................................................. G11B 15/48
(52) U.S. Cl. .................................................. 369/71
(58) Field of Search .......................... 369/71, 72, 292; 360/128; 15/DIG. 12, 256.5, 21.1

(56) References Cited

U.S. PATENT DOCUMENTS

| | | | | |
|---|---|---|---|---|
| 3,609,721 | * | 9/1971 | Meneley | 340/174 |
| 4,510,541 | * | 4/1985 | Sasamoto | 360/97 |
| 4,594,617 | * | 6/1986 | Tezuka | 360/128 |
| 4,870,636 | * | 9/1989 | Yamamoto | 369/71 |
| 5,088,083 | * | 2/1992 | Olson | 369/71 |
| 5,251,201 | * | 10/1993 | Nomura | 369/199 |
| 5,260,924 | * | 11/1993 | Hayashi | 369/71 |
| 5,424,884 | * | 6/1995 | Nonaka | 360/128 |

FOREIGN PATENT DOCUMENTS

| | | | | |
|---|---|---|---|---|
| 62-204441 | * | 9/1987 | (JP) | . |
| 63-136371 | | 6/1988 | (JP) | . |
| 1-140482 | | 6/1989 | (JP) | . |
| 2-29938 | | 1/1990 | (JP) | . |
| 2-29939 | | 1/1990 | (JP) | . |
| 2-29940 | | 1/1990 | (JP) | . |
| 2-232826 | | 9/1990 | (JP) | . |
| 04-221432 | | 8/1992 | (JP) | . |
| 3-29125 | * | 2/1991 | (JP) | 369/71 |
| 4-14690 | * | 1/1992 | (JP) | 369/71 |
| 4106771 | * | 4/1992 | (JP) | 369/71 |
| 4339327 | * | 11/1992 | (JP) | 369/71 |
| 5-47021 | * | 2/1993 | (JP) | 369/71 |

* cited by examiner

*Primary Examiner*—Brian E. Miller
(74) *Attorney, Agent, or Firm*—Greer, Burns & Crain, Ltd.

(57) ABSTRACT

An objective lens of an optical head is cleaned with a cartridge accommodating a cleaning disk with a brush thereon. The cleaning disk is rotated in apparatus to clean the surface of objective lens provided on the optical head. Simultaneously with causing the rotation of the cleaning disk by driving a spindle motor, the lens is moved toward and away from the disk by driving a lens actuator. Additionally, simultaneous reciprocation of a carriage carrying the optical head toward alternate inner and outer disk peripheries may be caused. Further, the operation of reciprocating the objective lens toward the inner and outer disk peripheries and the operation of moving the lens toward and away from the cleaning disk with the lens actuator may be performed in combination.

8 Claims, 10 Drawing Sheets

OPTICAL DISK APPARATUS WITH OPTICAL HEAD CLEANING

RELATED APPLICATION

This is a continuation of application Ser. No. 08/084,006, filed on Jun. 29, 1993 now abandoned.

BACKGROUND OF THE INVENTION

This invention relates to optical disk apparatuses used with replaceable optical disks each accommodated in a cartridge and, more particularly, to an optical disk apparatus, in which an optical head objective lens is cleaned using a cleaning disk.

In a usual optical disk apparatus, information is recorded by projecting a beam from a laser diode onto a rotating optical disk. The recorded information is reproduced through detection of changes in the intensity of the reflected beam from the optical disk, polarization surface and other characters. Such optical disk apparatus provides for high information recording density, and thus its applications to external memories of information processing systems are expected.

Normally, a laser beam emitted from the laser diode is focused by an objective lens provided on an optical head mounted on a carriage onto the optical disk. The reflected beam from the optical disk is also focused by the objective lens to be incident on a light-receiving element for conversion to an electric signal. The objective lens is driven for focus control by a lens actuator in the optical axis directions. Further, the carriage carrying the optical head is by a voice coil motor in radial directions of the disk for position control of the optical head to a desired position. The objective lens is found close to the disk surface, typically several millimeters apart. Therefore, its surface is readily contaminated by winds produced by the rotation of the optical disk. Contamination of the objective lens surface results in reduction of the laser beam intensity, scattering of the beam and disturbance of the laser beam intensity distribution, thus having significant adverse effects on the write performance, the read performance and further the servo performance such as focus servo and track servo. A method of cleaning the objective lens surface uses a cleaning disk. With the cleaning disk, the cartridge case and disk resemble those of the normal optical disk cartridge. A difference is that the cleaning disk has a brush provided on part of its surface. The cartridge accommodating the cleaning disk, like the normal optical disk cartridge, is loaded in the apparatus, and the disk is rotated, whereby the objective lens surface is cleaned by the brush on the disk.

However, in the cleaning of the objective lens with such a cleaning disk, the objective lens is held stationary, and its surface is rubbed by the brush of the rotating disk. This means that only part of the brush can be used for the cleaning. Therefore, the brush is liable to be deformed, and also it is contaminated only locally. Further, the rotating brush touches the stationary objective lens in a fixed fashion, and therefore the lens can not be perfectly cleaned.

Meanwhile, when writing data in the optical disk, the desired track is first erased by projecting a laser beam thereonto in the presence of an external magnetic field applied in the erase direction. Then, data is written by projecting a data-modulated laser beam in the presence of an external magnetic field applied in the write direction. Further, a verify read is done to confirm the written content. Therefore, with an optical head which projects a single laser beam, the optical disk has to be rotated by at least three rotations in the write operation. To permit this write operation at an increased speed, there is provided an optical disk apparatus, which has three exclusive laser diodes for erasing, writing and reading, and in which two objective lenses, one for erasing and the other for writing and reading, are mounted together with respective lens actuators on the optical head. With such a two-actuator structure optical disk apparatus, the erase, write and read operations can be performed during one rotation of the disk, and thus the write operation speed can be increased by three times compared to the case of the ordinary optical disk apparatus. However, in such a two-actuator optical disk apparatus the two lens actuators are disposed in the same radial position of the disk and considerably close to the disk in the circumferential direction thereof. Therefore, the cleaning of the succeeding objective lens with the cleaning disk with the brush is obstructed by the preceding one. Therefore, unlike the single-lens structure, the lenses can be cleaned only insufficiently.

SUMMARY OF THE INVENTION

The invention seeks to provide an optical disk apparatus, which permits sufficient cleaning of objective lenses.

According to the invention, when cleaning the surface of an objective lens provided on an optical head by causing rotation of a cleaning disk with a brush, a lens actuator is driven to move the lens toward and away from the cleaning disk simultaneously with the rotation thereof. Alternatively, the cleaning control may be such as to cause reciprocations of a carriage carrying the optical head toward the inner and outer peripheries of the cleaning disk simultaneously with the rotation thereof. Further, the operation of reciprocating the carriage carrying the optical head toward the inner and outer disk peripheries and the operation of moving the objective lens toward and away from the cleaning disk with a lens actuator may be performed in combination. As a further alternative of the cleaning control, the cleaning disk may be rotated alternately in the normal and reverse directions.

With an optical head having a two-actuator structure, simultaneously with moving one objective lens toward the disk surface with one lens actuator, the other objective lens is moved away from the disk surface with the other lens actuator, and vice versa, these operations being performed alternately.

The cleaning operation is performed after the cartridge accommodating a cleaning optical disk has been inserted in the apparatus and loaded on a spindle motor, and it is started in response to the issuance of a cleaning command from an upper order system. Further, the cleaning cartridge case may be provided with a peculiar physical shape, for instance recesses or holes, indicative of that the cartridge is for cleaning, and the cleaning operation may be started automatically when it is determined from the physical shape that the loaded cartridge is for cleaning. As the physical shape indicative of the cleaning cartridge, it is desirable to utilize media sensor holes provided on the case surface at specific positions thereof.

With such optical disk apparatus according to the invention, the objective lens surface can be cleaned sufficiently by repeatedly moving the objective lens with the lens actuator or actuators in the focus direction repeatedly to to bring the lens or lenses toward and away from the brush on the cleaning disk while causing rotation thereof. Further, by causing the optical head carried on the carriage in the radial directions of the disk with a head actuator, the entire brush can touch the objective lens or lenses to clean the same, that is, the entire brush can be used for the cleaning, and this eliminates or reduces local deformation or contamination of the brush. Further, in the case of the two-actuator structure, by alternately moving the two objective lenses in the focus direction with the two actuators, each lens can be cleaned without being obstructed by the preceding lens. Thus, the two objective lenses can be sufficiently cleaned.

The above and other objects, features and advantages of the present invention will become more fully apparent from the following detailed description with when the same is read with reference to the accompanying drawings.

DETAILED DESCRIPTION OF THE PREFERRED EMBODIMENT

Figure 1:
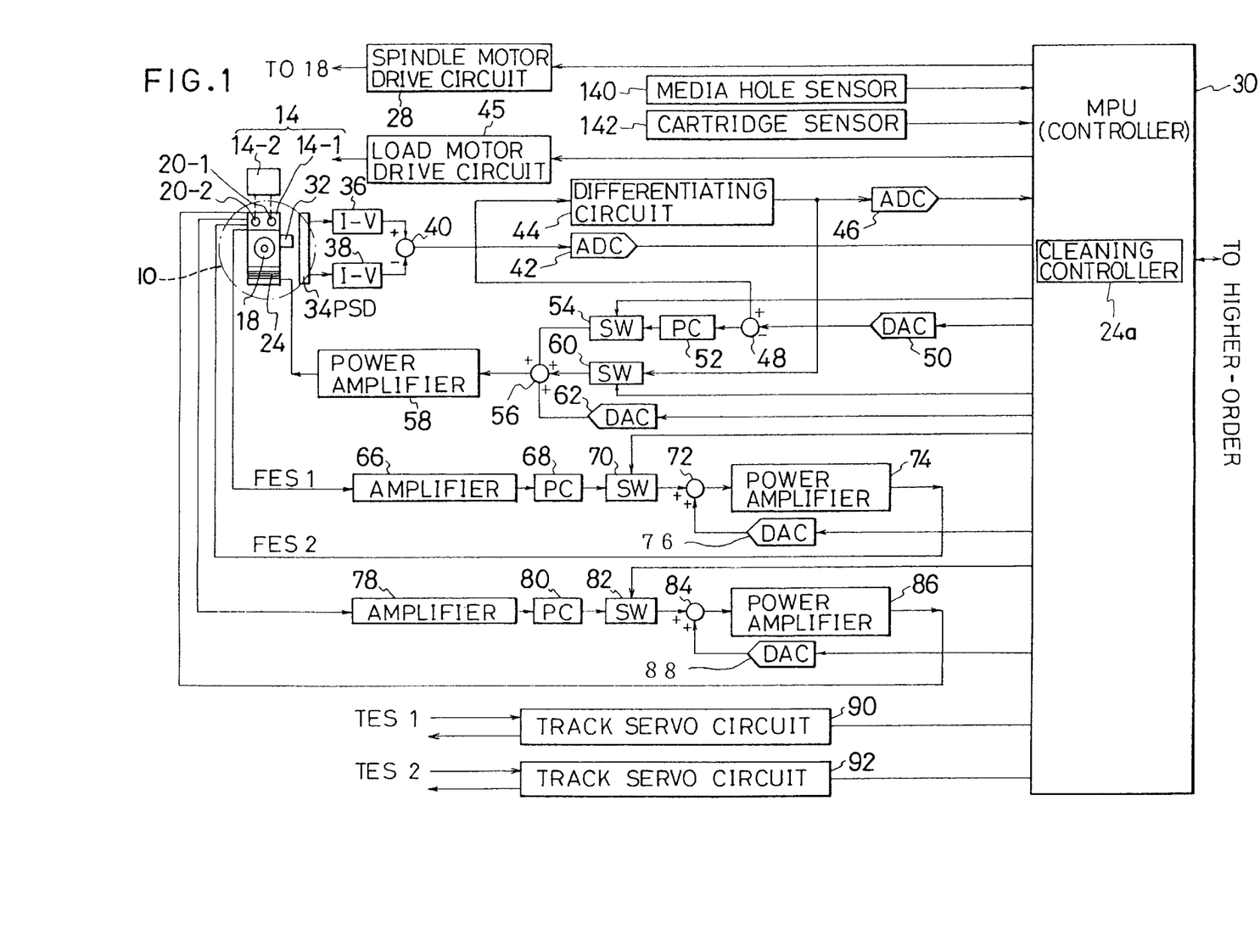
FIG. 1 is a schematic representation of the invention.

FIG. 1 shows an embodiment of the optical disk apparatus with cleaning control according to the invention. A disk 10 for cleaning the objective lens, shown by the phantom circle, is loaded and then chucked on a spindle motor 18. The spindle motor 18 is disposed in a box-like carriage. An optical head 14 is provided on one side of the carriage, and on the other side thereof is provided a voice coil motor 24 which serves as a head armature. In this embodiment, the optical head 14 has two lens actuators 20-1 and 20-2.

Figure 2:
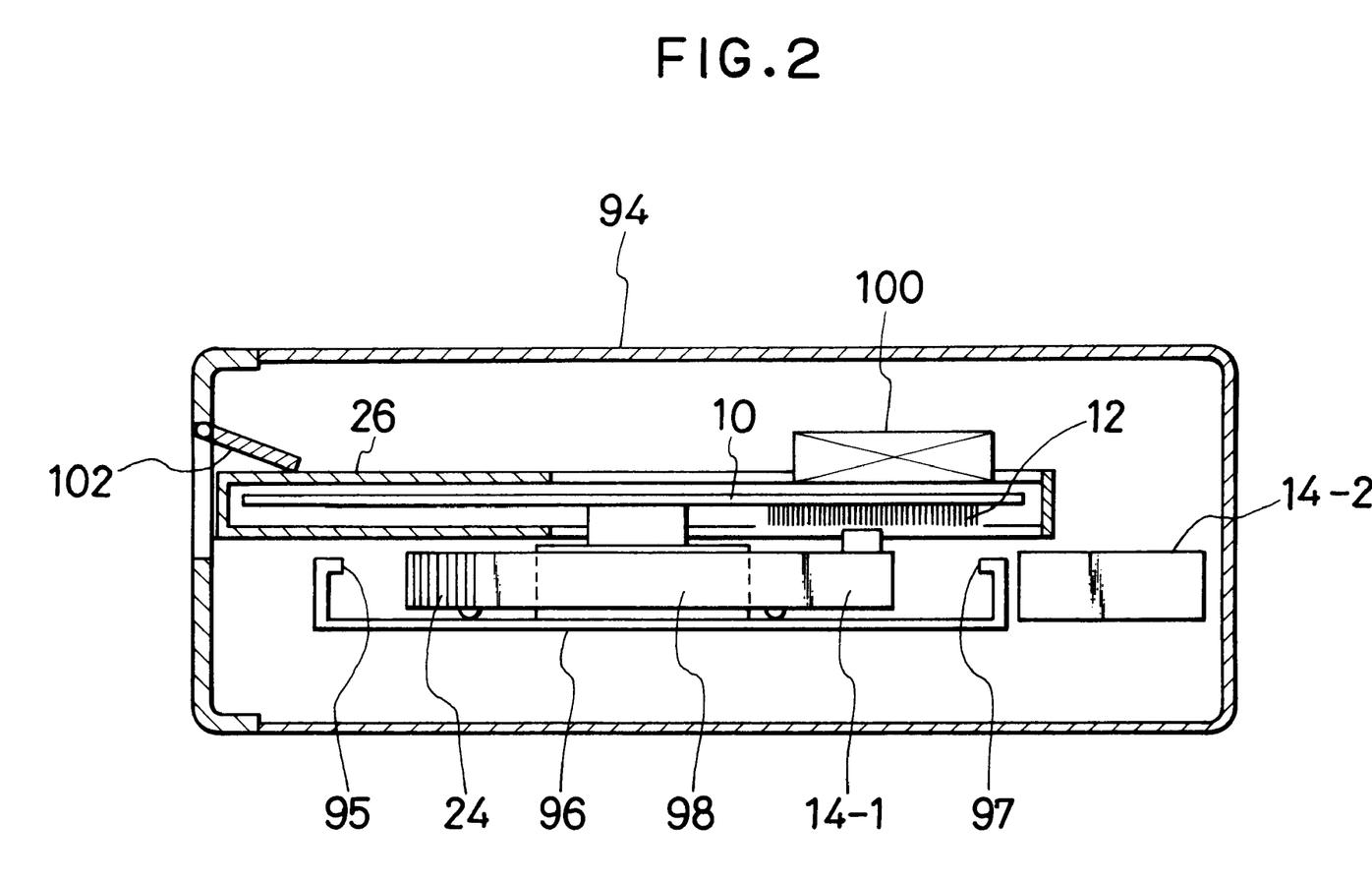
FIG. 2 is a view showing the internal structure of the optical disk apparatus according to the invention.

FIG. 2 shows the internal structure of the optical disk apparatus including the optical head. The carriage 98 is disposed movably on a support frame 96 provided in a housing 94. The carriage 98 carries an optical head movable part 14-1 provided on the right side and a voice coil motor 24 provided on the left side. The support frame 96 has an inner periphery and an outer periphery stopper 95 and 97 provided on the left and right sides, respectively. The carriage 98, as shown from the back side in FIG. 3, has a central rectangular cavity with the spindle motor 18 disposed therein. The cleaning disk 10 which is accommodated in a cartridge 26, is chucked by loading on the shaft of the spindle motor 18. The cleaning disk 10 has a brush 12 provided on the side of the optical head movable part 14-1. The cartridge 26 is chucked on the shaft of the spindle motor 18 by a loading mechanism when it is inserted into the housing 94 by pushing and opening a door 102 thereof.

Figure 3:
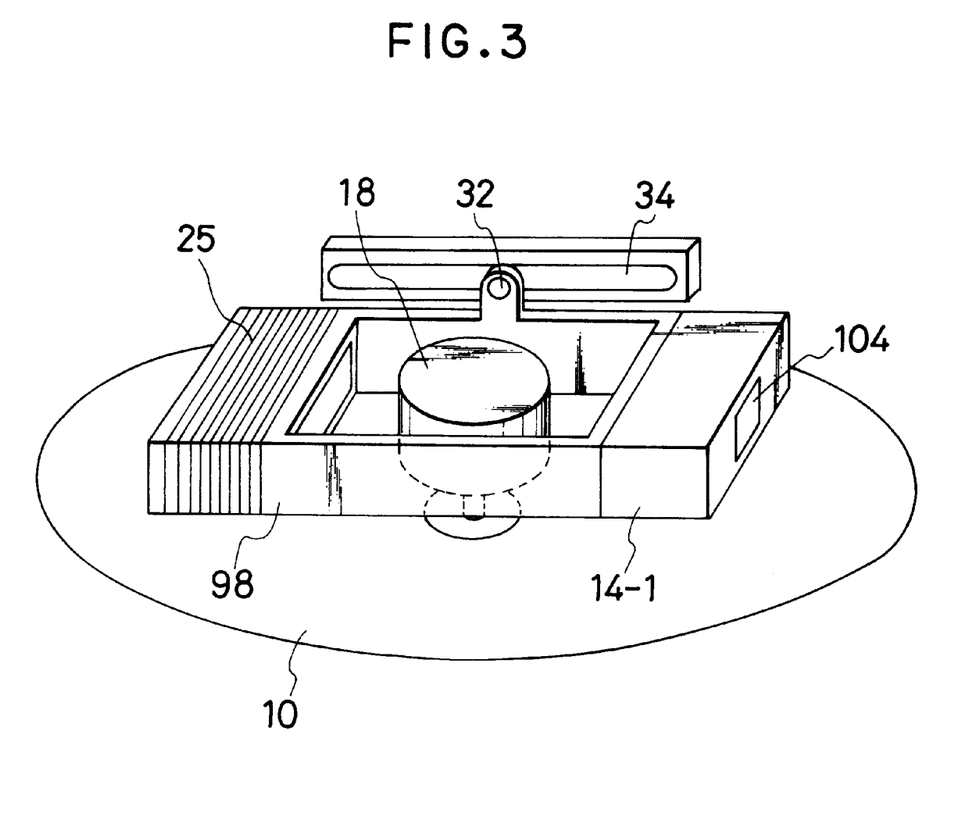
FIG. 3 is a back side perspective view showing a carriage shown in FIG. 2.

Further, as is clearly shown in the back side view of FIG. 3, a light-emitting diode 32 is mounted on one side of the bottom of the carriage 98, and on the stationary side a position sensor 34 is disposed such as to face the position detecting diode 32. The position of the carriage 98, i.e., the position of a beam in the optical head movable part 14-1 mounted on the carriage 98, can be detected by the light-emitting diode 32 and position sensor 34. The optical head movable part 14-1 provided on the carriage 98 has a light incidence window 104, and an optical head stationary part 14-2 is disposed on the stationary side as shown in FIG. 2 such that it faces the light incidence window 104. In the movable part 14-1 of the head a head optical system is mounted, which includes at least an objective lens and a lens actuator. The other components of the optical system, such as a laser diode, are provided on the side of the optical head stationary part 14-2 to reduce weight of the side of the optical head movable part 14-1 and reduce the inertia of the carriage 98.

Referring to FIG. 1 again, a position control servo unit is provided for controlling the position of the optical head 14 mounted on the carriage 98 with the voice coil motor 24. When the position sensor 34 is illuminated by light from the light-emitting diode 32, currents corresponding to the illuminated position is obtained from opposite terminals of the position sensor 34. These currents are converted in I-V converters 36 and 38 into voltage signals. An adder 40 takes the difference between these voltage signals to produce a carriage position signal. The carriage signal is converted in an A/D converter 42 into digital data which is input to a MPU 30 operating as a controller. The carriage position signal from the adder 40 is also differentiated in a differentiator and then converted in an A/D converter 46 into digital data which is input to the MPU 30. The carriage position signal from the adder 40 is further coupled through an adder 48 to a phase compensator 52, and thence through a switch 54 and an adder 56 to a power amplifier 58. The output of the power amplifier 58 drives the voice coil motor 24. An offset can be input to the adder 48 from a D/A converter 50. Further, the differential signal output from the differentiator 44 is coupled through a switch 60 to the adder 56, and the carriage position signal can be set in the adder from the MPU 30 through a D/A converter 62. The position control servo unit as described above can effect two basic controls, i.e., I, a follow control, and II, a speed control.

When seeking an optical disk track designated from a higher order system with the optical head 14, the speed control is effected. For this control, the switch 52 is turned off, while the switch 60 is turned on. When a desired speed signal is set in the adder 56 through the D/A converter 62, the MPU 30 causes the power amplifier 58 to drive the voice coil motor 24 to make zero the difference between the desired speed and the actual speed of the head obtained in the differentiator 44. When the head is moved to the desired track by this speed control seek operation, the control is switched over to the follow control. For the follow control, the switch 54 is turned off while the switch 60 is turned off, thus MPU 30 is forming a servo loop through the D/A converter 62, whereby the voice coil motor 24 is driven to hold the positioner at a predetermined position. At this time, an offset can be coupled to the adder 18 through the D/A converter 50. For example, it is possible to realize a positioner movement corresponding to a deviation of the optical disk by providing an offset. Further, since the track is formed spirally, a kick-back operation, i.e., kicking the head back by one track portion for every rotation of the disk, is caused by providing an offset. Further, by setting the position signal in the D/A converter 62 with both the switch 54 held "on" and the switch 60 held "off", the MPU 30 can forcibly cause the voice coil motor 24 to drive the positioner to a desired position.

The MPU 30 includes a cleaning controller 24a under its program control. When cleaning the objective lens with the cleaning disk 10, the cleaning controller 24a causes reciprocation of the positioner in the radial direction of the cleaning disk 10. For this radial reciprocation, the cleaning controller 24a executes control in one of the following two modes.

Mode 1:

With the servo switches 54 and 60 held "on" and "off" respectively, an offset signal is input to the adder 48 from the D/A converter 50 to drive the voice coil motor 24.

Mode 2:

With the servo switches 54 and 60 both held "off" a position signal is input to the D/A converter 62 to drive the voice coil motor 24.

Further, two focusing systems are provided for the lens actuators 20-1 and 20-2 provided in the optical head 14. The focusing system for the lens actuator 20-1 includes an amplifier 66, a phase compensator 68, a switch 70, an adder 72, a power amplifier 74 and a D/A converter 76. The focusing system for the lens actuator 20-2 includes an amplifier 78, a phase compensator 80, a switch 82, an adder 84, a power amplifier 86 and a D/A converter 88. Taking the focusing system for the lens actuator 20-1, for instance, a focus error signal FES1 obtained according to reflected light from the optical disk is amplified in the amplifier 66 and then leading phase compensated in the phase compensator 68. At the time of focus servo, the switch 70 is turned on by the MPU 30 to couple the output of the phase compensator 68 through the switch 70 and adder 72 to the power amplifier 74 so as to drive the lens actuator 20-1 such as to minimize the focus error signal FES1. The MPU 30 can couple an offset to the adder 72 through the D/A converter 76. This is the same with the focusing system for the lens actuator 20-2.

When cleaning the objective lens with the cleaning disk 10, the cleaning controller 24 causes reciprocation of the objective lens in the optical axis direction by driving the lens actuators 20-1 and 20-2. For the reciprocation of the lens in the optical axis direction, the MPU 30 provides suitable offsets to the D/A converters 76 and 88 with the switches 70 and 82 held "off". For the lens actuators 20-1 and 20-2, track servo circuits 90 and 92 are provided, respectively. The track servo circuits 90 and 92 cause the track actuator to move the objective lens in the state of position control of the positioner with the voice coil motor 24 such as to minimize the track error signals TES1 and TES2 from the optical head 14, thus causing the beam to follow the desired track. The spindle motor 18 is driven by a spindle motor drive circuit 28. A load motor (not shown), having a disk load mechanism is driven by a load motor drive circuit 45. To the MPU 30 are further connected a media hole sensor 140 for sensing a media hole formed in the cartridge and a cartridge sensor 142 for sensing the insertion of the cartridge and thereupon causing the start of the load motor.

Now, the two-actuator structure is driven in the optical axis direction in the cleaning control according to the invention will be described.

Figure 4:
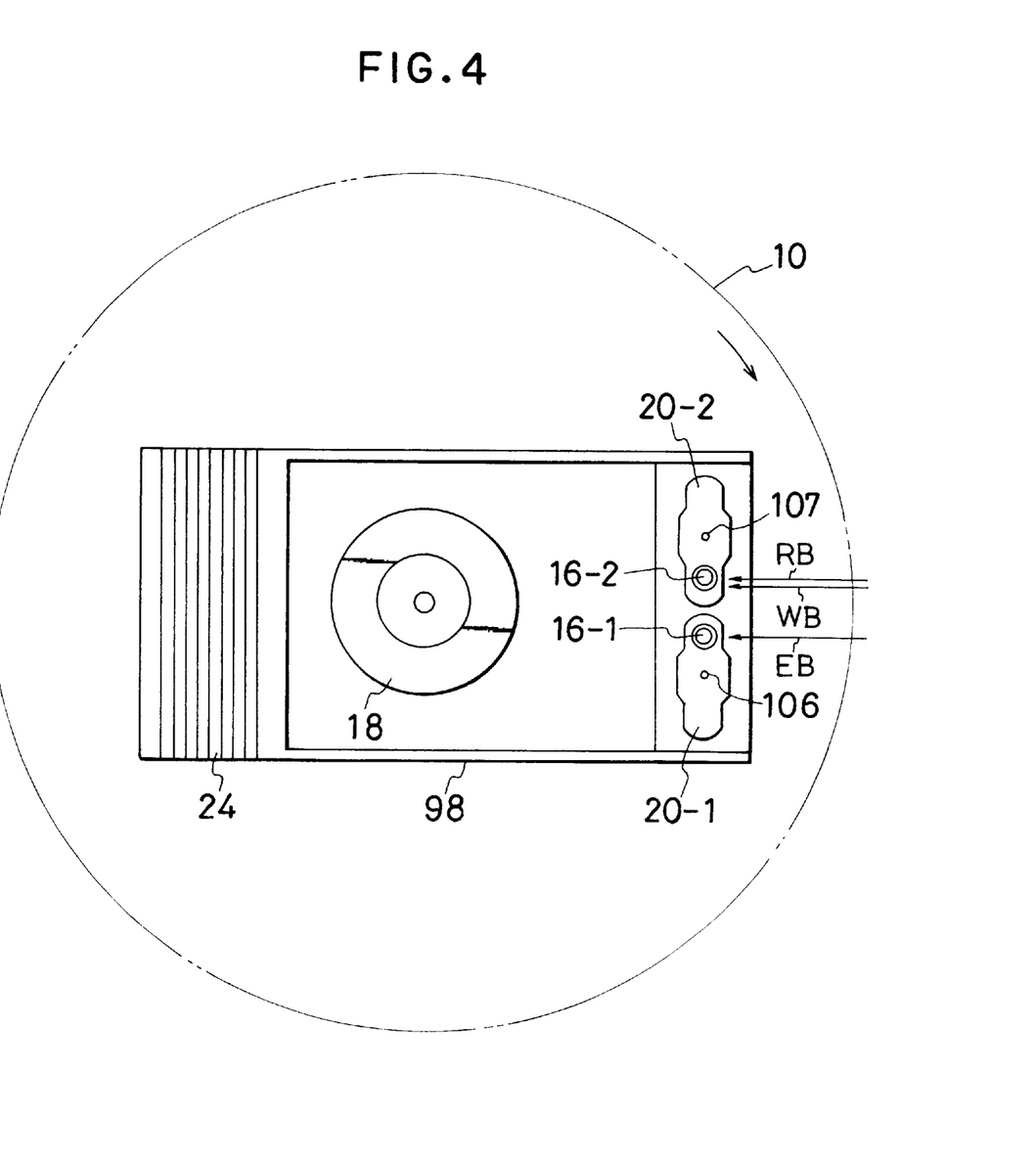
FIG. 4 is a view showing lens actuators mounted on the carriage shown in FIG. 2.

FIG. 4 shows the optical head used according to the invention. The optical head movable part which is provided on one end of the carriage 98, has two lens actuators 20-1 and 20-2. The lens actuators 20-1 and 20-2 are rotatable about their shafts 106 and 107, and their opposing portions are provided with respective objective lenses 16-1 and 16-2.

Assuming that the disk 10 is rotated in the clockwise direction as shown by the arrow, the objective lens 16-1 at the preceding position is illuminated by an erase beam EB. On the other hand, the succeeding objective lens 16-2 is illuminated by two beams, i,e., a write beam WB and a read beam RB.

Figure 5:
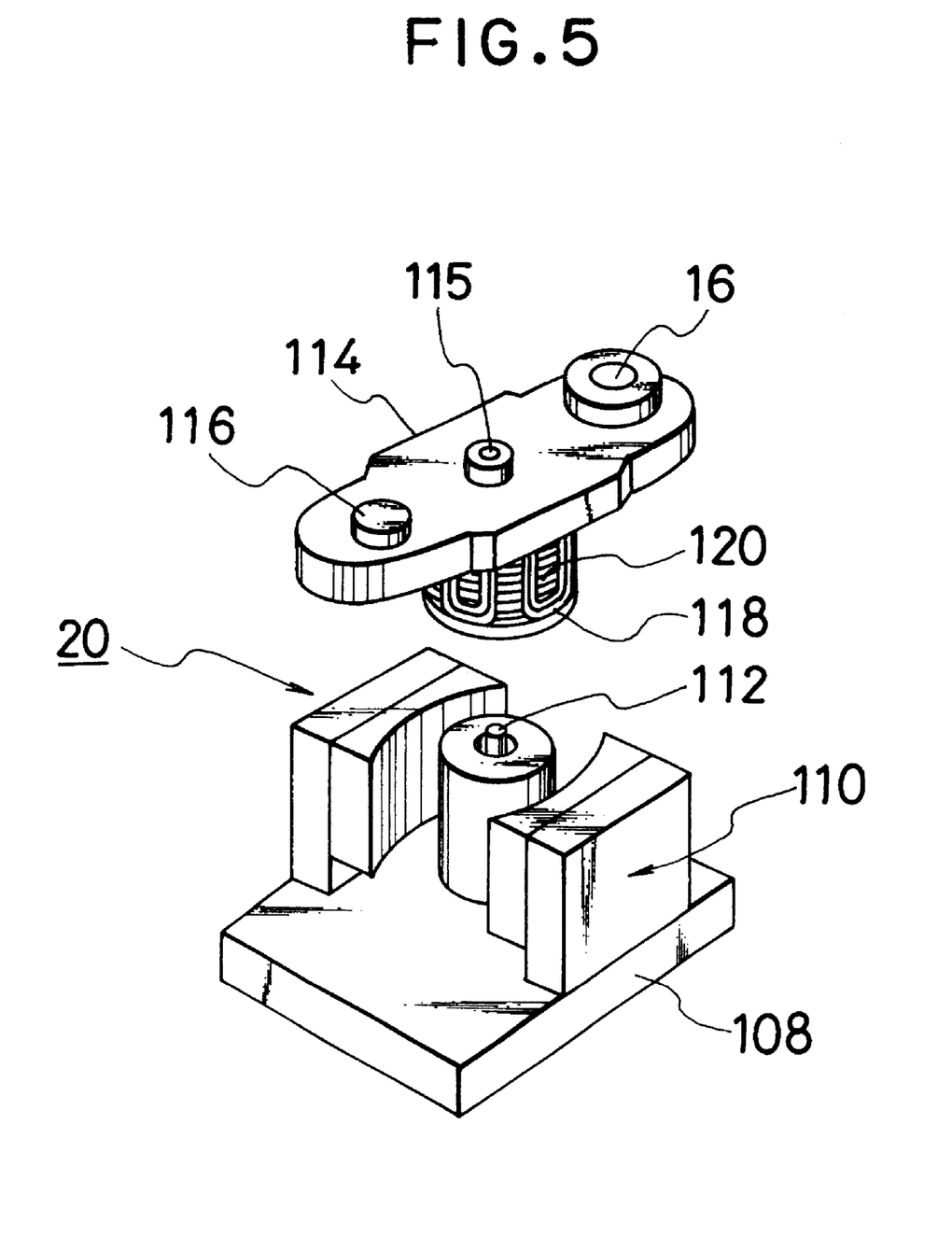
FIG. 5 is an exploded perspective view showing a lens actuator shown in FIG. 5.

FIG. 5 shows one of the lens actuators shown in FIG. 4. A base 108 supports a magnetic circuit assembly 110 secured to it. It also supports a post 112 extending upright through the center of the magnetic circuit assembly 110. A rotatable arm 114 is provided as a movable part with respect to the base 108 which is a stationary part. The rotatable arm 114 has a lower cylindrical portion, on which a tracking coil 118 and a focus coil 120 are wound. The rotatable arm 114 has an objective lens 16 mounted at one end and a balancer weight 116 mounted at the other end. It further has a central hole 115, which is fitted on the post 112 of the base 108. The rotatable arm 114 thus is rotatable about the post and simultaneously axially movable therealong. With the above lens actuator structure, in the cleaning control according to the invention the rotatable arm 114 is moved upward and downward to bring the objective lens 16 toward and away from the disk by causing a drive current through the focus coil 120.

Figure 6:
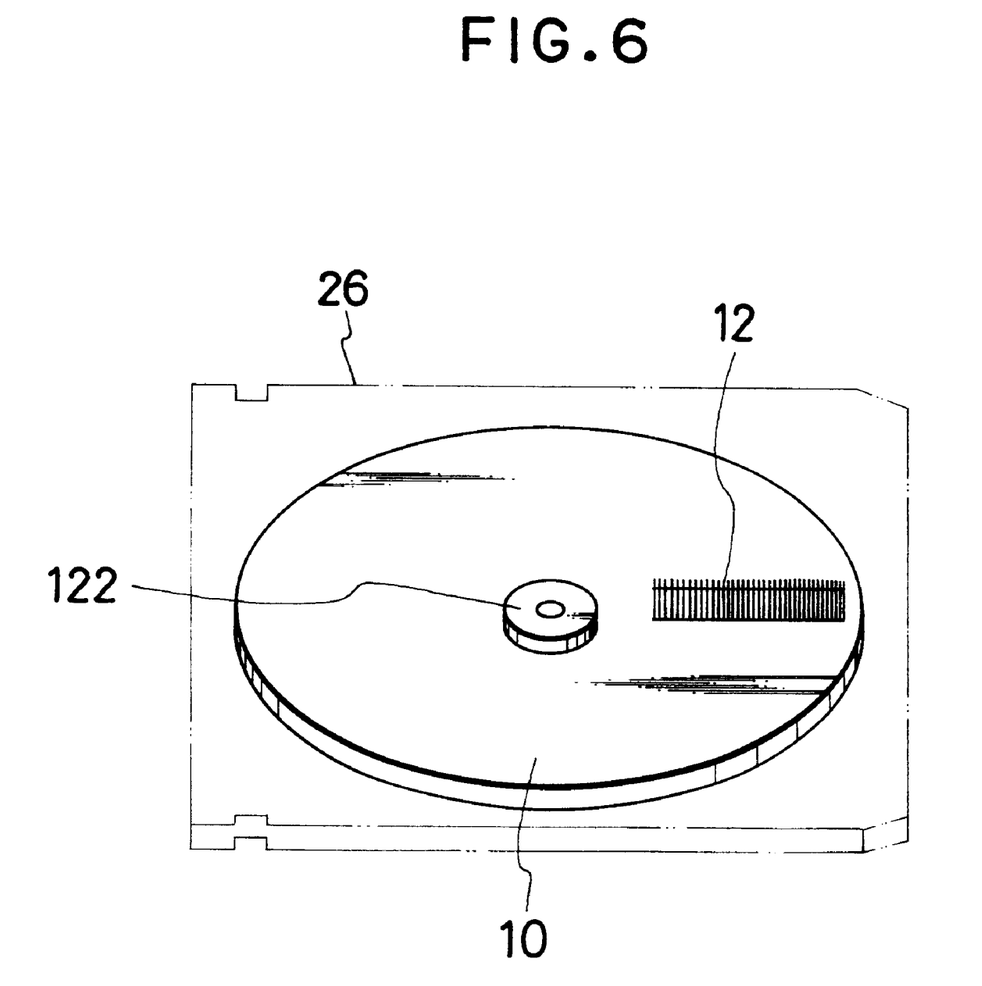
FIG. 6 is a a view showing a cleaning disk used according to the invention.

FIG. 6 shows a cleaning disk used according to the invention. A cleaning disk 10 is accommodated in a cartridge 26. The cleaning disk 10 has a brush 12 provided on one side and extending radially. It also has a central hub 122 made of a magnetic metal for chucking it on the spindle motor shaft.

Figure 7:
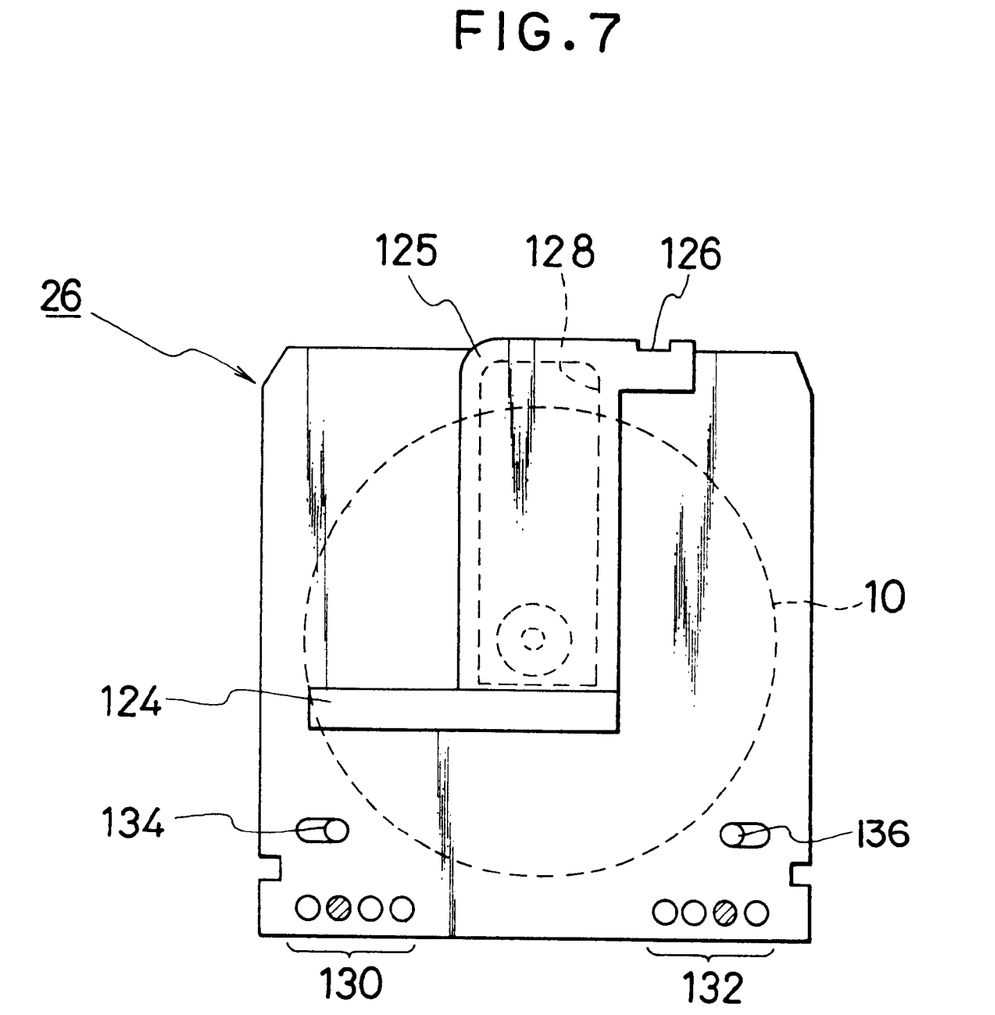
FIG. 7 is a view showing a cleaning disk cartridge used according to the invention.

FIG. 7 shows a cleaning disk cartridge used according to the invention. A 5-inch optical disk cartridge conforming to ISO standards is taken as an example. The cartridge 26 has a shutter 125, which can be opened and closed by a shutter operation member 124. The shutter 125 has an opening 128, which is closed as shown normally, that is, outside the apparatus. The shutter 125 has a rightward extension extending from its top portion and formed with a notch 126. By inserting the cartridge 26 into the apparatus, a lever end is received in the notch 126. With further pushing of the cartridge, the shutter 125 is moved to the left along the shutter operation member 124 so that the accommodated optical disk and the hub 122 thereof are exposed to the outside via the opening 128. The cartridge 26 has two, i.e., left and right, write inhibition members 134 and 136 provided on its lower portion. With the accommodated optical disk held in its inner position as shown, the writing of data in the disk is inhibited. Beneath each of the write inhibition members 134 and 136, four sensor holes are provided. For example, media sensor holes 130 have information about A side (or surface), and media sensor holes 132 have information about B side (or surface). The apparatus reads disk surface information according to whether the individual media sensor holes 130 and 132 are open or closed. In the ISO 5-inch optical disk cartridge, of the media sensor holes 130 and 132 only the second outermost ones as shown shaded are used, that is, no other media sensor hole is used. According to the invention, other media sensor holes than those shown shaded are used to indicate that the optical disk cartridge is for cleaning; for example, the innermost media sensor holes are utilized as open holes to indicate that the cartridge is for cleaning.

By utilizing the media sensor holes among those 130 and 132 that are not usually used for the purpose of indication of the cartridge as that for cleaning, the media sensor hole sensor 140 shown in FIG. 1 may be directly used to recognize the cleaning optical disk cartridge that is inserted in the apparatus. Of course, it is possible to provide the cartridge with other physical shape than the media sensor cartridges 130 and 132, for instance holes or depressions, to be detected for automatic recognition by the apparatus that the optical disk cartridge is for cleaning.

Figure 8:
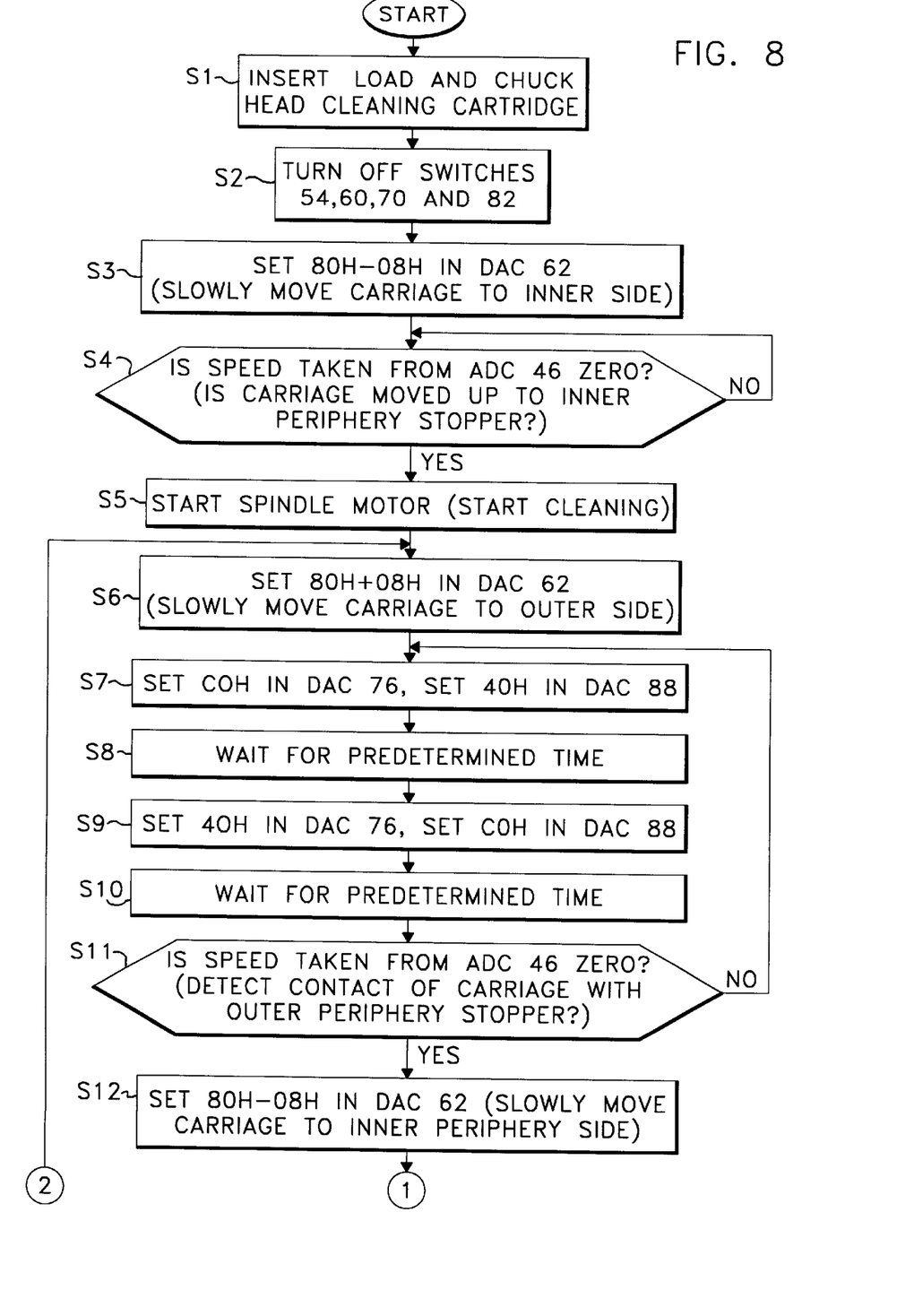
FIG. 8 is a flow chart illustrating a routine according to the invention.

Now, the operation of the cleaning controller 24 shown in FIG. 1 will be described with reference to the flow charts of FIGS. 8 and 9. Referring to FIG. 8, the cleaning cartridge is inserted in the drive, i.e., the optical disk apparatus in a step S1. When the cleaning cartridge is inserted, the optical disk apparatus loads and chucks the cartridge on the spindle motor. After the loading of the cleaning cartridge in the step S1, cleaning control is started under control of a cleaning command given from an upper order system, for instance. When the cleaning control is started under control of the cleaning command, a step S2 is executed, in which the switches 54, 60, 70 and 82 shown in FIG. 1 are turned off, and hexadecimal data "80H-08H" is set in the D/A converter 62. The data "80H" serves as a zero point signal, and the power amplifier provides zero drive current to the voice coil amplifier 24, that is, the carriage is not moved. Thus, when the data "80H-08H" is set in the D/A converter 62, the power amplifier 58 causes a slight current through the voice coil motor 24 to slowly move the carriage to the inner side. The carriage is thus slowly moved to the inner side in a step S3. In a subsequent step S4, a check is done as to whether the speed taken from the A/D converter 46 is zero, that is, a check is made as to whether the carriage has been moved up to the inner periphery stopper 95 of the support frame 96 shown in FIG. 2 when it is stopped. If the carriage has been moved to the inner periphery stopper, the speed is determined to be zero in the step S4. As a result, the spindle motor 18 is started in a step S5. In a subsequent step S6, the data in the D/A converter 62 is switched over to "80H+08H". As a result, an inverse current is caused through the voice coil motor 24 to slowly move the positioner to the outer side. In a subsequent step S7, hexadecimal data "C0H" and "40H" are simultaneously set in the D/A converters 76 and 88, respectively to drive the objective lenses in the optical axis direction. As a result, the lens actuators 20-1 and 20-2 simultaneously drive the objective lenses, for instance, toward and away from the disk, respectively. In a subsequent step S8, a predetermined wait time is provided, and the objective lens approaching the disk is cleaned with the brush. In a subsequent step S9, converse to the step S7, hexagonal data "40H" is set in the D/A converter 76 to quickly move one of the objective lenses away from the disk, while at the same time hexagonal data "C0H" is set in the D/A converter 88 to quickly move the other objective lens toward the disk. In a subsequent step S10, a predetermined wait time is provided, and the cleaning of the objective lens approaching the disk with the brush is caused by the output of the D/A converter 88. In subsequent step S11, a check is done as to whether the speed taken from the A/D converter 46 is zero, that is, a check is done as to whether the carriage has been moved up to the outer periphery stopper 90 of the support frame 96 shown in FIG. 3. Upon detection in the step S11 of the contact of the carriage with the outer periphery stopper, a step S12 is executed, in which, like the step S3, the hexadecimal data "80H-08H" is set in the D/A converter 62 to slowly move the carriage to the inner side again.

In subsequent steps S13 through S17, like the steps S7 through S11 in FIG. 8, opposite drive data are set in the D/A converters 76 and 88 alternately, and this sequence of operations is repeated until it is found in the step S17 that the carriage has moved up to the inner periphery stopper. If it is detected in the step S17 that the carriage has been moved up to the inner periphery stopper, a check is done in a step S18 as to whether the number of reciprocations of the carriage has reached a preset value, for instance 4. If the number is less than 4, the routine is returned to the step S6 in FIG. 8 to repeat the cleaning operation noted above. If it is detected in the step S18 that the preset value, for instance 4, is obtained as the number of carriage reciprocations, a step S19 is executed, in which hexagonal data "80H" for providing zero point is set in the D/A converters 62, 76 and 88 used for the cleaning control, and in a subsequent step S20 the spindle motor 18 is stopped. In a subsequent step S21, the load motor is driven to cause unloading of the cartridge and ejection thereof from the apparatus, thus bringing an end to the series of cleaning operations.

Figure 9:
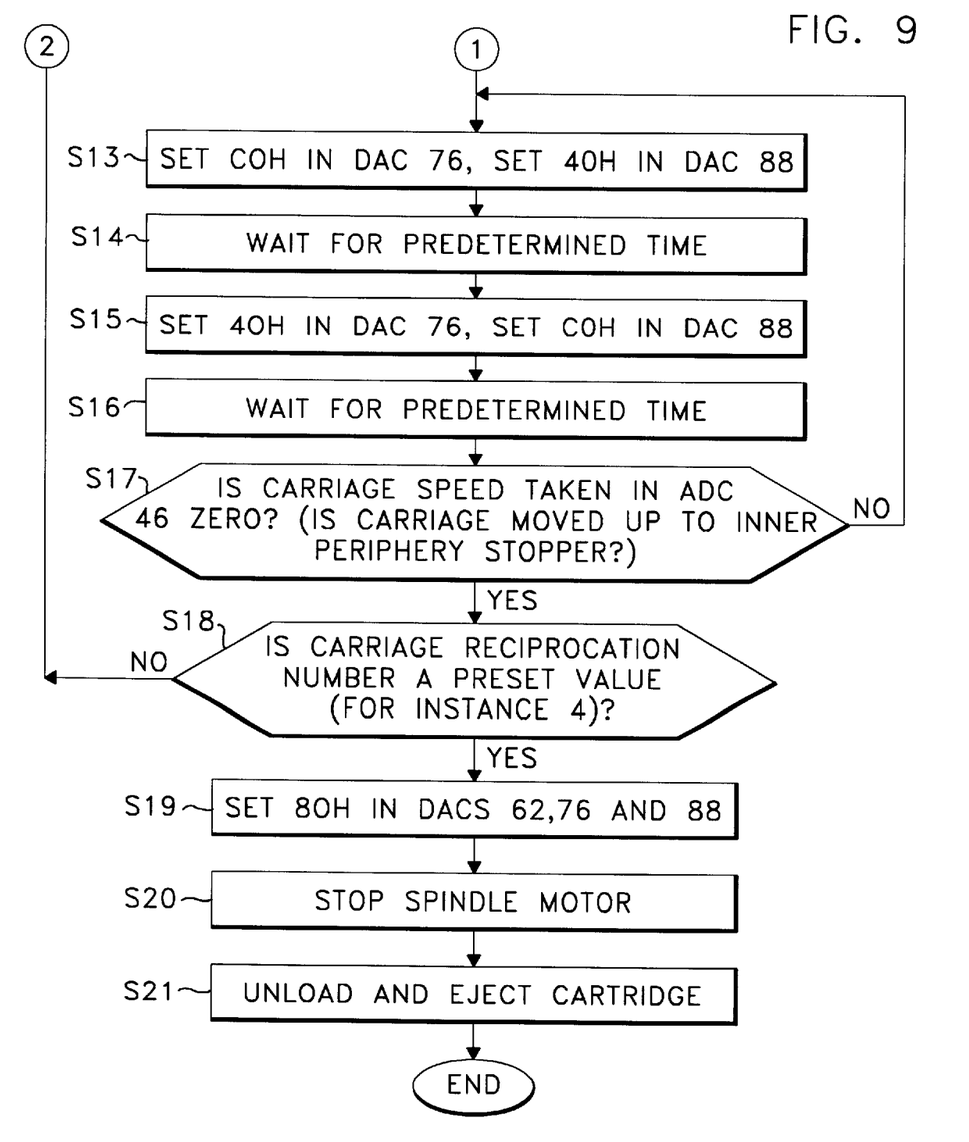
FIG. 9 is a flow chart illustrating a subsequent routine to that shown in FIG. 8.

In the cleaning control shown in FIGS. 8 and 9, the the objective lenses are vertically driven quickly by switching the hexadecimal data "40H" and "C0H" set in the D/A converters 76 and 88. However, it is possible to change the data "40H" and "C0H" in steps each of 1 to cause gradual vertical movement of the objective lenses.

Figure 10:
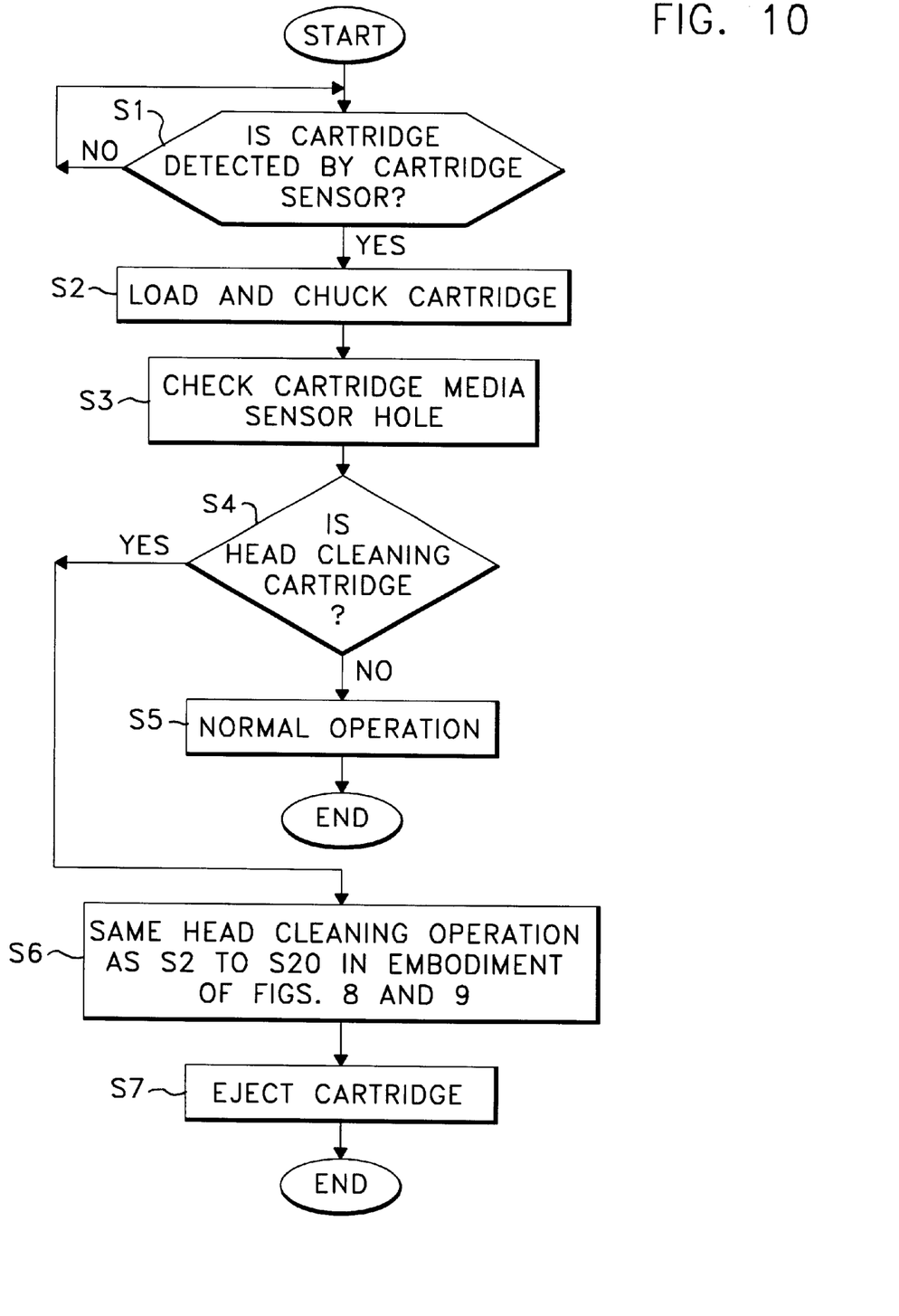
FIG. 10 is a flow chart illustrating an automatic cleaning routine according to the invention.

FIG. 10 is a flow chart illustrating an automatic cleaning routine that is executed in case where a cleaning cartridge can be recognized on the side of the optical disk apparatus by utilizing the media sensor holes 130 and 132 as shown in FIG. 7. If a cleaning cartridge inserted in the optical disk apparatus is detected by the cartridge sensor in a step S1, a step S2 is executed in which the load motor is driven to cause loading of the cartridge and chucking thereof on the spindle motor. In a subsequent step S4, the media sensor holes of the cartridge are checked. Then, if it is determined in a step S4 that the loaded cartridge is for cleaning, a step S6 is executed, in which the cleaning operation in the steps S2 to S20 in FIGS. 8 and 9 is performed. When the cleaning is ended, the cartridge is unloaded and ejected in a step S7, thus bringing an end to the cleaning routine. In case when a normal cartridge, i.e., a cartridge other than that for cleaning, is inserted, this is detected in the step S4, whereupon a step S5 of normal read or write operation is executed.

As a different example of the cleaning control according to the invention, the cleaning disk may be rotated by the spindle motor not only in the normal direction of rotation but also in the reverse direction. As a further alternative, it is possible to cause repeated rotation in alternate normal and reverse directions. To this end, a step for switching the rotational direction of the spindle motor may be provided between the steps S17 and S18 in the flow chart of FIG. 9.

Further, while in the above embodiment the cleaning of lens is carried out by rotating the cleaning disk with the brush, since according to the invention it is possible to movement of the objective lens in the radial direction of the disk and also in the vertical directions, the invention is applicable as well to a cleaning cartridge, in which the brush is not rotatable but is secured to the optical head.

As has been described in the foregoing, according to the invention the brush provided on the cleaning disk touches the objective lens not in a constant fashion but in a variable fashion, and this permits a greatly enhanced cleaning effect to be obtained. In addition, since the entire brush is used to clean the lens, the brush is not locally deformed or contaminated, and thus it is possible to extend the cleaning life of the brush. Further, when the brush has become short due to fluctuations in cleaning or in long use, sufficient cleaning is obtainable because the lens can be moved vertically by the actuator.

What is claimed is:

1. An optical disk apparatus comprising:
    a shaft rotatably driven by a motor;
    a cleaning disk, having a brush, removably mounted on said shaft;
    an optical head with an objective lens driven by a lens driver; and
    cleaning control means for rotating said cleaning disk in a state when said cleaning disk is mounted on said shaft by starting said motor while simultaneously moving the objective lens toward and away from said cleaning disk and reciprocating said optical head toward the inner and outer peripheries of the disk by driving said lens driver;

wherein said cleaning control means causes rotation of said cleaning disk in alternate normal and reverse directions.

2. An optical disk apparatus comprising:

a shaft rotatably driven by a motor;

a cleaning disk, having a brush, removably mounted on said shaft;

an optical head with two objective lenses, each driven by an associated lens driver; and cleaning control means for rotating said cleaning disk in a state when said cleaning disk is mounted on said shaft by starting said motor while simultaneously moving the objective lenses toward and away from said cleaning disk and reciprocating said optical head toward the inner and outer peripheries of the disk by driving said lens driver;

wherein said cleaning control means alternatively moves one of said objective lenses toward the disk surface with the associated one of said lens drivers while simultaneously moving the other objective lens away from the disk surface with the other lens driver.

3. The optical disk apparatus according to claim 1, wherein said cleaning disk with said brush is accommodated in a cartridge, said cleaning control means causing the loading of said cleaning disk medium on said shaft in response to the insertion of said cartridge accommodating said cleaning disk and then causing a cleaning operation in response to the issuance of a cleaning command from an upper order system.

4. The optical disk system according to claim 1, wherein said cleaning disk with brush is accommodated in a cartridge with a case having a physical shape indicative of the fact that the cartridge is a cleaning cartridge, said cleaning control means causing a cleaning operation when it is determined from the physical shape on the cartridge case that the inserted cartridge is a cleaning cartridge.

5. The optical disk apparatus according to claim 1, wherein said cleaning control means responds to a cleaning command from an upper order system by performing cleaning routines which control said starting of said motor and moving of said objective lens.

6. The optical disk apparatus according to claim 2, wherein said cleaning disk with said brush is accommodated in a cartridge, said cleaning control means causing the loading of said cleaning disk medium on said shaft in response to the insertion of said cartridge accommodating said cleaning disk and then causing a cleaning operation in response to the issuance of a cleaning command from an upper order system.

7. The optical disk system according to claim 2, wherein said cleaning disk with brush is accommodated in a cartridge with a case having a physical shape indicative of the fact that the cartridge is a cleaning cartridge, said cleaning control means causing a cleaning operation when it is determined from the physical shape on the cartridge case that the inserted cartridge is a cleaning cartridge.

8. The optical disk apparatus according to claim 2, wherein said cleaning control means responds to a cleaning command from an upper order system by performing cleaning routines which control said starting of said motor and moving of said objective lens.

* * * * *